Dec. 20, 1927. E. O. ESTWING Re. 16,820

HAND TOOL

Original Filed July 17, 1924

Inventor:
Ernest O. Estwing
By Wilson & McCrea
Attys.

Reissued Dec. 20, 1927. Re. 16,820

UNITED STATES PATENT OFFICE.

ERNEST O. ESTWING, OF ROCKFORD, ILLINOIS, ASSIGNOR TO ESTWING MANUFACTURING COMPANY, INC., OF ROCKFORD, ILLINOIS, A CORPORATION OF ILLINOIS.

HAND TOOL.

Original No. 1,578,502, dated March 30, 1926, Serial No. 726,433, filed July 17, 1924. Application for reissue filed October 16, 1926. Serial No. 142,143.

This invention relates to hand striking tools and implements and has more particular reference to axes, hammers and hatchets.

The primary purpose of the invention is to provide an improved hand tool, such for example as an axe, hammer or hatchet, in which the head and handle are drop-forged in one piece and so shaped and treated that maximum strength is obtained with minimum weight and material and the tool is well balanced and substantially unbreakable. By this I mean that it is unbreakable when used in the manner and for the purposes intended for tools of this kind. By making the handle and head in one piece the many objections to the conventional construction employing fastening means or devices of some sort for securing the head to the handle are entirely obviated. Moreover, according to my invention the handle is reduced substantially from end to end to a comparatively narrow elongated cross-section the major axis of which is parallel with that of the head. This reduced cross-section throws the center of gravity in the head or close thereto, according to the style of the tool, which gives a highly desirable balance. This balance enables more efficient use of the tool because the greatest weight being in the head enables the greatest degree of manual effort to be transmitted in the blow. With such a tool there is the least lost effort due to the balance of handle and head and consequently the tool is less tiring to use and the strokes are more effective than with the conventional style of tool. The foregoing results are attained to better advantage when the handle is tapered in thickness gradually from the head to its remote end, thus further throwing the center of gravity close to the head and providing the greatest strength adjacent thereto, at which point the greatest strain and stress occurs from the effects of the blow. Another advantage resulting from a tool shaped as described is that it may be used very effectively as a pry for splitting wood and in some instances as a crow bar by sidewise pressure on the handle after the blade has been inserted between or driven into the parts to be separated. In order to fill out the hand grip suitable scales or grips are riveted or otherwise secured to the sides of the handle.

The foregoing features of construction are made possible in a commercially practical tool by reason of the method employed in manufacturing it. According to my invention the axe, hammer or hatchet is formed or shaped in one piece by drop-forging. The forgings or tool blanks are then normalized to reduce internal strain in the structure or to establish equilibrium of the constituents. The tool blanks are then annealed for machineability and following this are hardened by heat treatment as will be explained more fully hereinafter.

Other objects and attendant advantages will be appreciated by those skilled in this art as the invention becomes better understood by reference to the following description when considered in connection with the accompanying drawing, in which—

Figure 1:
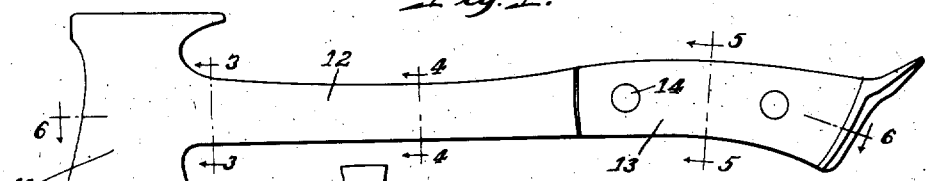
Figure 1 is a side elevation of a scouting or outdoor axe or hatchet, embodying my invention.
Figure 7:
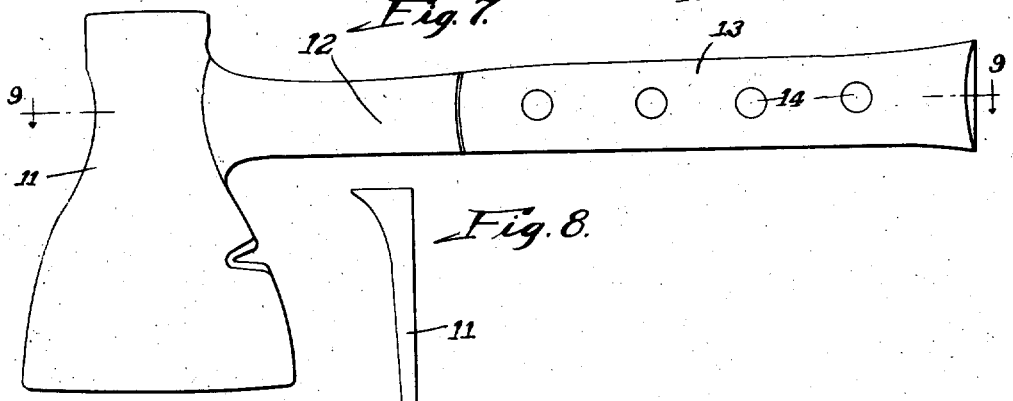
Figure 8:
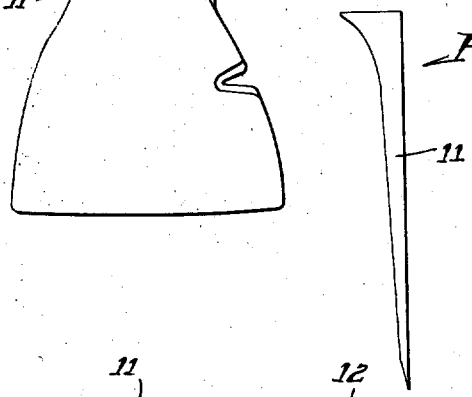

Figs. 3, 4, 5 and 6 are sections taken on the lines 3—3, 4—4, 5—5 and 6—6, respectively, of Fig. 1;

Fig. 7 is a side elevation of a carpenter's hatchet embodying my invention;

Fig. 8 is an end view of the head shown in Fig. 7; and

Figure 9:
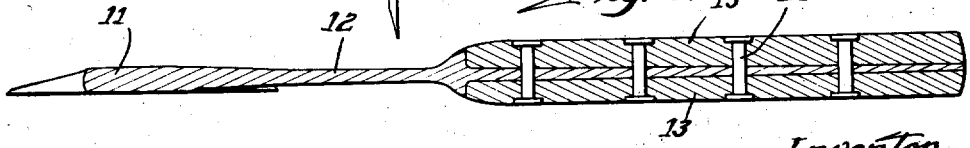

Fig. 9 is a section taken on the line 9—9 of Fig. 7.

My invention is applicable to any hand tool having a striking head such for example as an axe, hammer or hatchet; consequently the following description of the invention except in so far as it relates to the specific shape characterizing any one tool from another, is applicable to all tools of this type.

Figure 2:
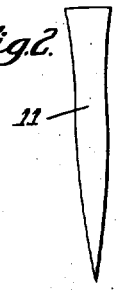
Fig. 2 is an end view of the head of said hatchet.
Figures 3, 4, 5:
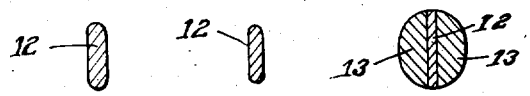
Figure 6:
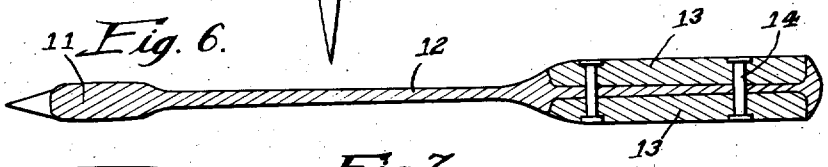

Considering first the structural characteristics common to these tools, my invention provides a metal head and a handle shank in one piece. The head, designated generally by 11, may be of any suitable shape, such as an axe head, hammer head or hatchet head, except that according to my invention the head may be comparatively narrow for effective cleavage because no eye for the handle or helve is necessary. This is especially desirable in carpenters' hatchets as shown in Fig. 8, and is also desirable in scouting or outdoor hatchets as shown in Fig. 2. The handle shank consists of a neck 12[a] and a grip-carrying portion 12[b]. At the front end of the grip-carrying portion are shoulders 12[c]. The neck is made thin in a plane transverse to the plane of the head, its mean thickness being approximately one-third of its width in the plane of the head. This reduces wind resistance to a minimum and gives maximum strength in the plane in which most stresses occur when using the tool in striking. The greatest cross-sectional area is at the juncture of the head and handle, as shown in Figs. 3 and 6, so that the greatest strength is at the point of greatest stress. The handle tapers in thickness toward its outer end and is therefore of a gradually reducing cross-section as clearly shown in said Figures 3 to 5 inclusive. This reduced cross-section although not necessarily tapered, is an essential feature of my invention for the reason that it throws the center of gravity forward, to or in proximity to the head with consequent advantages as described above and for the further reason that the reduction in sectional area is carried out in a way so that it provides the greatest requisite strength with the least amount of metal. The reduced cross-section is made possible by the method of manufacture hereinafter described and is, therefore, dependent on such method in so far as the production of a commercially practical and saleable tool is concerned.

Wooden scales or grips 13 are secured to the sides of the grip-carrying portion 12[b] of the handle shank by suitable means such as rivets 14. The grips may, however, be of any siutable or preferred material which is light in weight and durable.

It will be observed from the foregoing that my invention contemplates the manufacture of a striking tool by forming and shaping the striking head and handle shank by forging operations to produce an integral, one-piece tool. The tool is forged into a novel shape characterized by its comparatively flat, narrow handle shank which comprises a web portion to which the grips or scales 13 are attached and a neck portion intermediate this and the striking head. The forging and hammering operations also compress and reduce the size of the grain of the steel to give greater strength. It will be noted that the cross-section of the handle shank throughout both the neck and web portions is reduced transversely and elongated in a plane parallel with the major axis of the striking head and is further reduced or tapered longitudinally at both sides gradually from the striking head to the opposite end. By reason of this narrow cross-section less metal is employed in the handle which, consequently, is of less weight than in any prior striking tool having a head and a handle shank in one piece, whether it be in an axe, hatchet, hammer or the like. This is accomplished without impairing the shape and usefulness of the tool; and moreover, it enables a better distribution of the metal for strength and balance for the reason that the handle cross-section is comparatively flat and narrow and elongated in the plane of the stresses incident to striking blows, and also because the necessary weight in the head will be contributed to by the thicker transverse section of the shank portion adjacent thereto. The only exception to the above-mentioned reduction in transverse cross-section is the provision of a fillet or shoulder on both sides of the handle web or grip-carrying portion at either one or both ends thereof. These fillets merely serve to fill in the space between the ends of the grips and the neck so as to give a smooth outside surface and to protect the ends of the grips especially when they are of wood. The fillets are not therefore, essential to my invention because grips of other shapes and materials might be used. It will be observed that in actual practice the neck and grip-carrying portion are thinner or narrower in transverse cross-section than shown in the drawings, in proportion to the size of each tool shown. That is, the drawings show the neck and grip-carrying portion cross-sections thicker in order to more clearly illustrate the longitudinal transverse taper.

For some embodiments of the invention it is desirable that the forged tool be heat-treated to remove all strains incident to the forging operations and to uneven cooling of the shaped tool, to refine the microstructure characteristic of the metal, and to increase the tensile strength, raise the elastic limit and reduce ductility. By combining the above-mentioned characteristics of shape and definite physical properties by reason of this method of manufacture I obtain a new result, namely, a hand striking tool which is substantially unbreakable for the purposes intended and has less material in the handle and better balance and feel than any prior one-piece metal tool, so far as I am aware.

Furthermore, a striking tool made in accordance with my invention is far more useful than prior tools of this kind, that is, it can be used for more purposes and can be subjected to harder use without damaging the tool. This is due primarily to the unusual strength in the handle and its adaptation to prying, splitting and pulling beyond the range of tools of this character on the market.

The method of manufacture is as follows: A high carbon steel should be used, preferably one having the following chemical composition: carbon, .70–.80%; manganese, .60–.80%; sulphur, .03–.04%; and silicon, .09–.20%. In addition to complying with the foregoing analysis, the steel must be free from nonmetallic inclusions when examined under the microscope. The tool will be formed and shaped by drop-forging operations, it being noted that the forging temperatures should be closely observed and kept within the range of from 1900° to 2100° F. The forgings are then normalized to established equilibrium by heating to 1550° F. and quenching in oil. The next step is to anneal for machineability, that is, for rough grinding and drilling the rivet holes, obtaining a Brinell hardness of 190–200. Following this the tool blanks will be hardened by heat treatment. The first step is to heat the blanks to 1450° F., then quench in mineral oil, thus obtaining a martensitic condition on the cutting edge and a troostito-martensitic condition in the body and handle. The blanks will then be drawn at 406° F. in oil, whereby the cutting edge is converted to troostite-martensite condition and the handle to sorbotroostite, after which the edge may be ground and the tool finished as by applying the handle grips, polishing, etc. This gives the most desirable physical structure for a tool of this kind and makes possible the use of the reduced cross-section in the handle above described.

By reason of the foregoing method of manufacture a high grade tool may be produced and sold at a reasonable price. Furthermore, the finished product has superior qualities because there is no danger or trouble incidental to the head loosening and the handle is unbreakable when put to the uses intended for tools of this kind. As a result of said method the physical properties of the steel after it has been normalized and annealed are approximately: tensile strength 120,000 lbs. per square inch, yield point 90,000 lbs. per square inch, reduction of area 20% and elongation 15%; and after the heat treatment operations approximately the following physical properties are obtained in the finished tool: tensile strength 180,000 lbs. per square inch, yield point 150,000 lbs. per square inch, reduction of area 5% and elongation 5%.

While the foregoing describes a preferred method of practicing my invention, the particular steps taken and the examples showing proportions used are merely for purpose of illustration. It should therefore, be understood that in manufacturing striking tools in accordance with my invention changes may be made in details of construction, as for example, when applying the invention to the manufacture of different tools, such as axes, hatchets, hammers and the like, also that any suitable or equivalent steps and operations might be employed for securing the desired physical properties in the metal of the finished tool, without departing from the spirit and scope of the invention as expressed in the appended claims, in which—

I claim as my invention:

1. A hand striking tool having a forged one-piece striking head and handle shank, said shank comprising a neck and a grip-carrying portion, the mean thickness of the neck in a plane transverse to the plane of the head being less than one-third of its width in the plane of the head, and a grip on the grip-carrying portion, the weight of the handle as a whole being less than that of the head, and the handle shank having transverse shoulders at the front end of the grip-carrying portion.

2. A hand striking tool having a forged one-piece striking head and handle shank, said shank comprising a neck and a grip-carrying portion, the mean thickness of the neck in a plane transverse to the plane of the head being less than one-third of its width in the plane of the head, said shank being heat-treated to permit maximum reduction in thickness.

3. A hand striking tool having a steel head and a handle connected thereto, said handle comprising a steel neck and a grip, the mean thickness of said neck in a plane transverse to the plane of the head being less than one-third of its width in the plane of the head and the weight of the entire handle being a small proportion of the weight of the whole tool.

In testimony whereof, I have hereunto affixed my signature.

ERNEST O. ESTWING.